(12) United States Patent
Loucks

(10) Patent No.: US 6,601,447 B1
(45) Date of Patent: Aug. 5, 2003

(54) ACOUSTIC ANEMOMETER FOR SIMULTANEOUS MEASUREMENT OF THREE FLUID FLOW VECTOR COMPONENTS

(75) Inventor: Richard B. Loucks, Severna Park, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/146,056

(22) Filed: May 16, 2002

(51) Int. Cl.[7] ................................................. G01P 5/00
(52) U.S. Cl. .................. 73/170.11; 73/170.13; 73/861.18; 73/861.13; 73/861.26
(58) Field of Search .................... 73/181, 189, 170, 73/861.29, 194, 170.11, 170.13, 861.18, 861.26, 861.27, 170.07

(56) References Cited

U.S. PATENT DOCUMENTS

| | | | |
|---|---|---|---|
| 4,031,756 A | 6/1977 | Rotier et al. | .................. 73/189 |
| 4,038,870 A | * 8/1977 | Rotier | .......................... 73/181 |
| 4,221,128 A | * 9/1980 | Lawson et al. | .......... 73/861.29 |
| 5,218,865 A | 6/1993 | Djorup | ........................ 73/189 |
| 5,357,795 A | 10/1994 | Djorup | .................... 73/170.11 |

* cited by examiner

*Primary Examiner*—Edward Lefkowitz
*Assistant Examiner*—Alandra Ellington
(74) *Attorney, Agent, or Firm*—Edward L. Stolarun

(57) ABSTRACT

An apparatus for measuring a fluid flow velocity vector including a signal generator for generating an oscillating electrical signal, an acoustic transmitter for generating an acoustic signal proportional to the oscillating electrical signal; and at least three acoustic receivers for receiving the acoustic signal and generating electrical signals which are phase shifted by the influence of the fluid flow, and a signal processor for receiving and processing the oscillating electrical signal and the electrical signals generated by the at least three acoustic receivers to determine time delays for each acoustical receiver caused by the influence of the fluid flow which are processed to determine the fluid flow velocity vector components.

10 Claims, 3 Drawing Sheets

ACOUSTIC ANEMOMETER FOR SIMULTANEOUS MEASUREMENT OF THREE FLUID FLOW VECTOR COMPONENTS

BACKGROUND OF THE INVENTION

The invention relates in general to anemometers, and, in particular, to sonic (acoustic) anemometers.

There exist acoustic anemometers, also called sonic anemometers, that measure the temperature and velocity vector components of the wind in the lower atmosphere. In all cases, the anemometers are relatively large, and data is acquired at low rates. The fundamental principle behind the operation of these existing acoustic anemometers is based on the transit time for an acoustic signal to travel along a fixed path from an acoustic transmitter to a receiver.

FIG. 1A shows a prior art anemometer 10. FIG. 1B illustrates the effect of wind velocity vector U on the sound ray vectors for the single axis, dual path configuration shown in FIG. 1A. If $t_1$ and $t_2$ are the transit times for an acoustic signal to leave transmitters 12 and 14 and arrive at the receivers 16 and 18, $$t_1 = d/(m \cos \alpha - U_\xi),$$

$$t_2 = d/(m \cos \alpha + U_\xi),$$

where $U_\xi$ is the wind vector component parallel to the fixed path 20, d is the path length, m is the local speed of sound in air, and $\alpha = \sin^{-1}(U_\phi/m)$ is the angle of projection of m onto $U_\phi$, the wind vector component normal to $U_\xi$.

Two methods can be used to at least determine $U_\xi$. If the transmitters produce a simultaneous acoustic signal, then the difference between the transit times can be used, $$U_\xi \approx \frac{m^2(t_2 - t_1)}{2d}.$$

This reduction is an approximation since it is assumed that $U_\xi \ll m$. A second method of reduction uses the transit time reciprocal, such that $$U_\xi \approx \frac{d}{2}\left(\frac{1}{t_1} - \frac{1}{t_2}\right).$$

The second method is exact, and is not dependent on m. Therefore, the local ambient temperature need not be determined.

The local ambient temperature can be determined from the transit times and the normal component of the velocity vector, $$m^2 = \frac{d^2}{4}\left(\frac{1}{t_1} + \frac{1}{t_2}\right)^2 + U_\phi^2,$$

$$= \gamma RT,$$

were $\gamma$ is the ratio of specific heats for air, typically $\gamma=1.4$, R is the gas constant for air, and T is the local ambient absolute temperature.

This method of reducing transit times into wind vector components limits the efforts in miniaturizing the measuring apparatus. A trade-off between transit time difference measurement and data acquisition rates is present. The distance d must be sufficiently long to allow high resolution of the transit time differences. Conversely, increasing the length of d requires a decrease in the tone frequency from the acoustic transmitters 12, 14, thereby limiting the highest sample rate possible with a digital data acquisition system.

Commercially available acoustic anemometers usually have d ranging between 10 to 20 cm, and the tone frequency from the transmitters at about 20 kHz. The configuration of several acoustic anemometers established in an array can simultaneously determine the three vector components of the wind, as well as the local ambient temperature. With typical dimensions, the smallest apparatus will have a sensing volume diameter of about 40 cm.

SUMMARY OF THE INVENTION

The present invention is an acoustic anemometer capable of instantly measuring all three components of the local wind velocity vector. In one embodiment the local temperature is also measured acoustically. The purpose of the anemometer is to measure the local wind velocity vector components and temperature to sufficiently high resolution such that all velocity and temperature turbulence scales are captured.

DETAILED DESCRIPTION OF THE PREFERRED EMBODIMENTS

One advantage of the invention over the prior art is the miniaturization of the array configuration. Another advantage is the capability to measure higher wind velocities. The miniaturization is due to a combination of three developments: 1) a different method of reducing the transmitter/receiver lead-lag signal to wind velocity components, a change in the method of determining the transmitter and receiver electrical signal lead-lag, and a new configuration of the spatial locations of the receivers with a single transmitter. The invention is capable of accurately measuring wind velocity vector components up to Mach=0.6 and of resolving the smallest scales of turbulence, up to five Kolmogorov length resolution in highly dissipative cases.

These developments allow simultaneous and exact reduction of all wind vector components and temperature. The simultaneous analytical solution of the wind components and temperature, although more difficult, provides a more meaningful and accurate solution of the array centroid and the measurement of significantly higher wind velocities. The sensing volume diameter can be made as small as a few millimeters. The size limitations depend on the acoustic frequency of the transmitter tone, the sophistication of the transmitter/receiver design and fabrication, and the electronics to process the receiver information.

The method to determine the wind vector components is a simultaneous solution of the wind components and temperature from the phase lead/lag of each transmitter/receiver signal. In the prior art, two transmitter/receiver pairs along a fixed path were necessary. In the case of this invention, only one transmitter and at least three receivers are required. A signal processor processes the transmitter and receiver electrical signals to determine the time difference, $\Delta\tau$, as induced by the wind velocity components. Delta $\tau$ ($\Delta\tau$) is the difference between the time ($\tau$) it takes for the acoustic wave to propagate from a transmitter to a receiver in the presence of a wind vector and the time it takes for the acoustic wave to propagate from a transmitter to a receiver in the presence of no wind vector. In the prior art, the time differences between two transmitter/receiver pairs are found by using a high speed clock. As the tone frequency increases, and the fixed path length decreases, the time resolution drops, even with super high clock speed. The present invention eliminates the need for a clock separate from the data acquisition system.

Figure 1A:
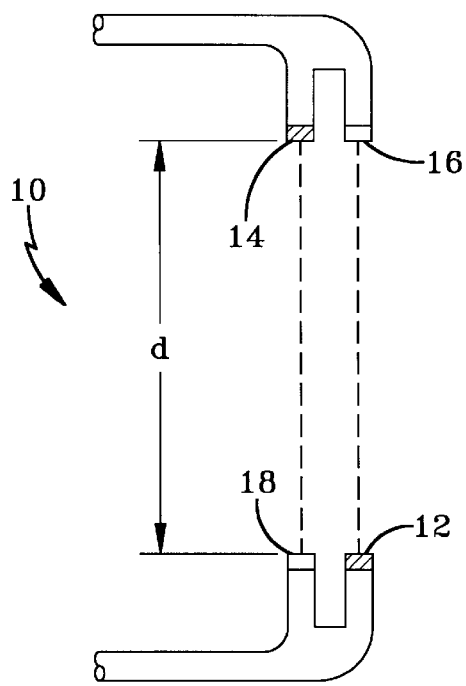
FIG. 1A shows a prior art anemometer.
Figure 1B:
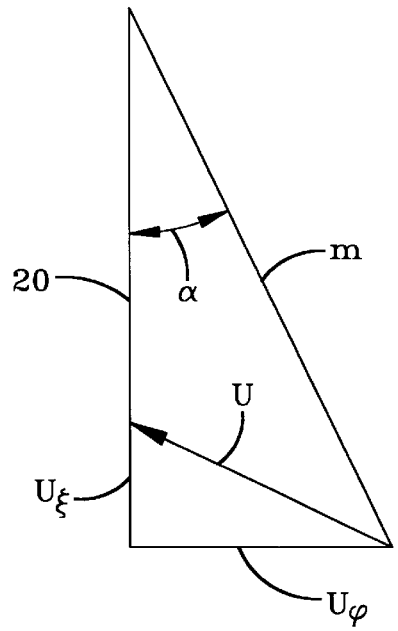
FIG. 1B shows the effect of wind velocity vector U on the sound ray vectors for the single axis, dual path configuration shown in FIG. 1A.
Figure 2:
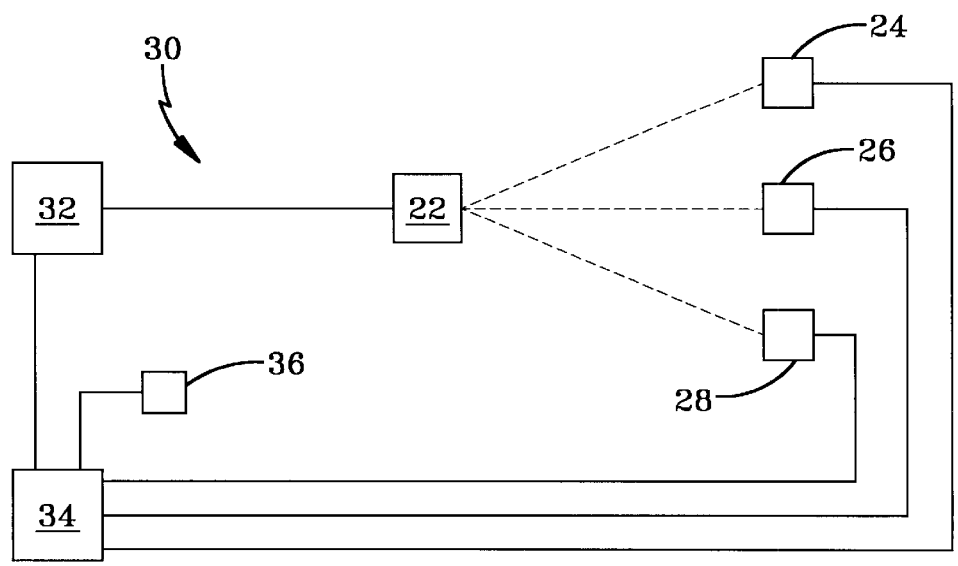
FIG. 2 is an electrical schematic of an embodiment of the present invention.

FIG. 2 is an electrical schematic of an embodiment of an anemometer 30 according to the present invention. Anemometer 30 includes a signal generator 32 for generating an electrical signal; an acoustic transmitter 22 for receiving the electrical signal and generating an acoustic signal (shown as a dotted line in FIG. 2); at least three acoustic receivers 24, 26, 28 for receiving the acoustic signal and generating electrical signals in response thereto; and a signal processor 34 for receiving the electrical signal generated by the signal generator 32 and the electrical signals generated by the at least three acoustic receivers 24, 26, 28. Signal processor 34 processes the electrical signals to determine the wind velocity vector. Data acquisition by the signal processor 34 occurs at a high sampling rate, for example, 10 kHz, so that the smallest scales of atmospheric turbulence can be resolved.

The transmitter 22 generates a high frequency (for example, 350 kHz) acoustic tone which is sensed by the receivers 24, 26, 28. The electronic signal produced by the receivers 24, 26, 28 is compared to the electronic signal used to generate the transmitter tone as $$S_T(t)=A \sin(ft+\alpha),$$

$$S_R(t)=B \sin(ft+\beta),$$

where A and B are constants (which are determined as shown below), $\alpha$ is the delay associated with the time an acoustic signal will travel a fixed path d without any wind influence, and $\beta$ is the phase lead or lag. If there is no wind influencing the anemometer, $\alpha=\beta$.

The signals from the single transmitter 22 and each of the at least three receivers 24, 26, 28 are directly compared by synchronization with the transmitter signal, and then subtraction of each receiver signal from the transmitter signal such that $$\Delta S(t)=S_T(t)-S_R(t).$$

Synchronization of $\Delta S(t)$ with $S_T(t)$ at the tone frequency results in the ability to determine the phase lead or lag by looking at $\Delta S(0)$. It can be shown that $\Delta\tau$ is a function of $\Delta S(0)$. Signal processor 34 may determine $\Delta S(t)$ by using an analog subtraction circuit and then converting $\Delta S(t)$ to a digital form for use in computing the wind vector. Alternatively, the analog signals $S_T(t)$ and $S_R(t)$ may be digitized with an analog to digital converter prior to computing $\Delta S(t)$.

In one embodiment, a temperature sensor 36 is connected to the signal processing unit 34. The temperature sensor 36 may be, for example, a thermocouple. In another embodiment, the temperature is determined acoustically using the ideal gas equation for air.

Figure 3:
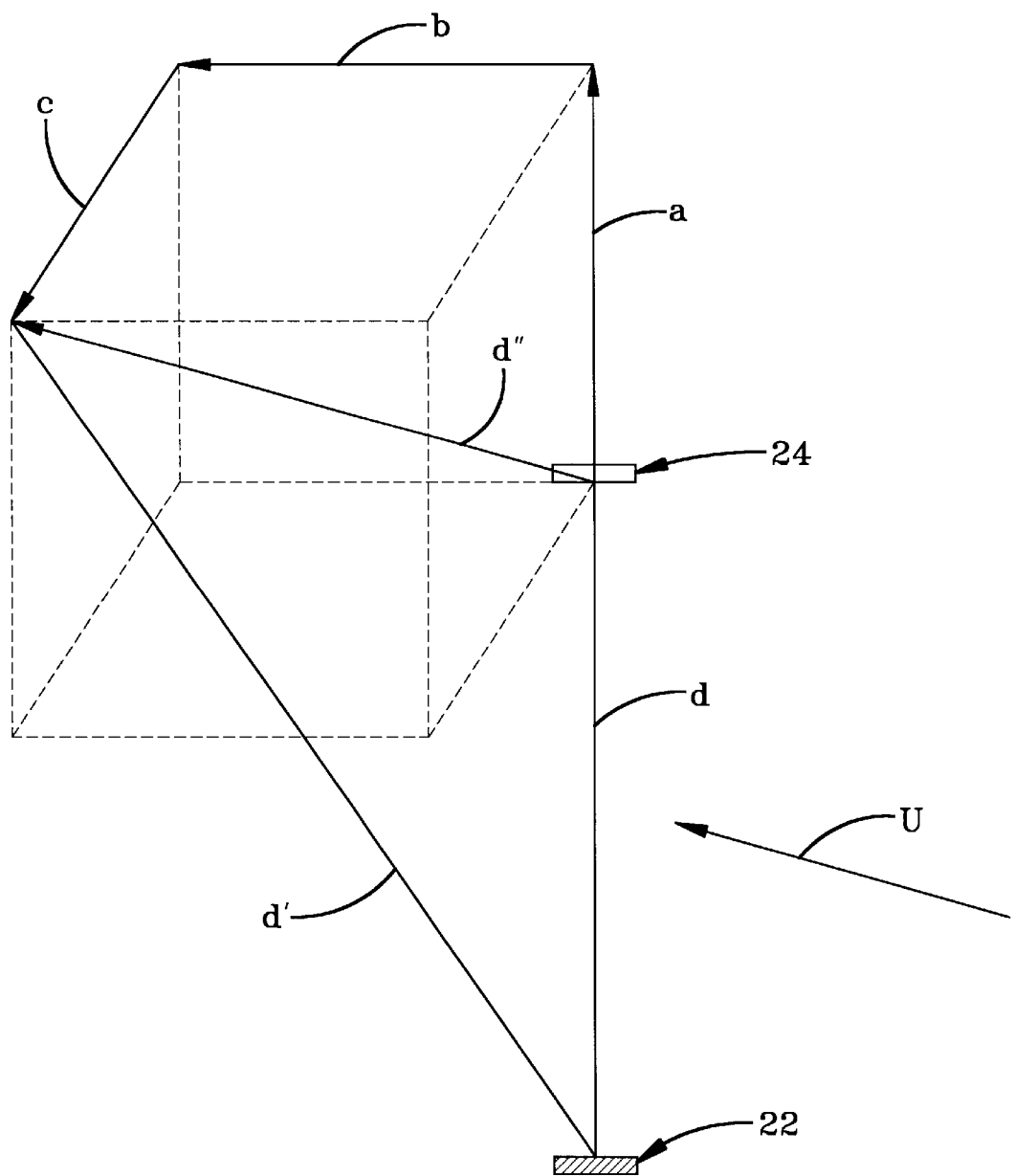
FIG. 3 shows the instantaneous influence by a wind vector of arbitrary magnitude and direction U on a sensor frame of reference rotated relative to the global frame of reference.

FIG. 3 shows the instantaneous influence by a wind vector of arbitrary magnitude and direction U on a receiver frame of reference rotated relative to the global frame of reference. Here, the effect of the wind is represented as a change in the length of the fixed path d to d'. The vector difference, d'−d=d". The magnitude of d" is also defined by its components, a, b, and c, such that $$d'-d=a+b+c.$$

The distance of the fixed path d is defined by the local instantaneous speed of sound, m, such that $$d=m(\tau-\Delta\tau).$$

For each receiver 24, 26, 28, the distance of the fixed path d may be different. In a preferred embodiment, each receiver 24, 26, 28 is the same distance d from the transmitter 22. The distances from the transmitter 22 to each receiver 24, 26, 28 are related to the local instantaneous wind vector by $\tau$, the time it takes for the acoustic wave to propagate from the transmitter 22 to the receiver 24 (or 26 or 28). Solving for the magnitudes of the components with the velocities defined by the local Cartesian coordinate system, $$U=ui+vj+wk,$$

the spatial difference magnitude for each receiver can be redefined as $$d'^2=a^2+c^2+(b+d)^2,$$

$$m^2\tau_i^2=u_i^2\tau_i^2+w_i^2\tau_i^2+[v_i\tau_i+m(\tau_i-\Delta\tau_i)]^2.$$

The subscript i is used to denote the receiver/transmitter pair and related measured $\tau$—as referenced from the local rotated Cartesian coordinate frame. Expanding this result, dividing through by $\tau^2$, and making the following substitutions, $$\eta_i = \frac{\Delta\tau_i}{\tau_i},$$

$$A_i=2m(\eta_i-1),$$

$$B_i=m^2(2\eta_i-\eta_i^2),$$

results in the following equations;

$$q^2=A_iv_i+B_i,$$

$$v_i=C_iu+D_iv+E_iw,$$

where the coefficients $C_i$, $D_i$, $E_i$, are determined by the rotation of the global frame of reference to the local frame of reference. In this manner, the other receivers, which are arbitrarily rotated relative to the array frame of reference, can be used to solve the array velocity components. It is noted that the three receivers 24, 26, 28 and the transmitter 22 are not coplanar.

Using the identity $$q^2=u^2+v^2+w^2,$$

the local transverse velocity component, $v_i$, from each receiver is used to solve for the global frame of reference velocity components such that by substitution, $$u^2+v^2+w^2-A_i(C_iu+D_iv+E_iw)-B_i=0.$$

While a direct solution of the above equation is not found, the solution for u, v, and w can be found iteratively by a number of known numerical methods. The result is that solutions for high wind velocities are possible since all three components of the wind are accounted for in the solution.

A simplification of the reduction process is applicable for low wind speeds, that is, less than 40 m/s. The vector difference, d", is approximated by ignoring the horizontal effects of the wind components, that is $$d'-d=b.$$

The solution of the magnitude changes to $$d'^2=(b+d)^2,$$

$$m^2\tau_i^2=[v_i\tau_i+m(\tau_i-\Delta\tau_i)]^2.$$

Again by expanding the result, dividing through by $\tau^2$, one is able to find a direct solution for $v_i$ as simply $$v_i=m\eta_i.$$

In turn, the solutions for the global wind component magnitudes is found by the system of equations $$v_i=C_iu+D_iv+E_iw.$$

This solution can also be used to provide the seed guess for an iterative solution as described above.

Figure 4A:
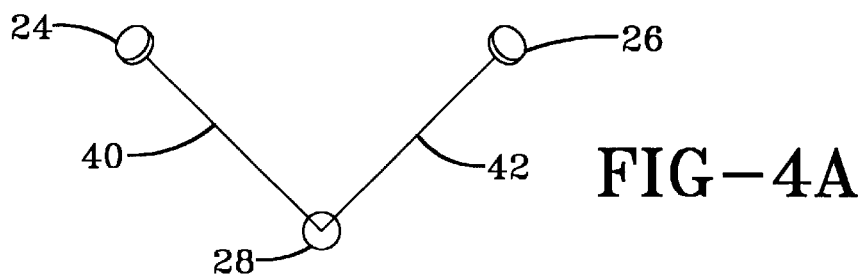
FIGS. 4A, 4B and 4C schematically show three views of an exemplary spatial configuration of a transmitter and three receivers in accordance with the present invention.
Figure 4B:
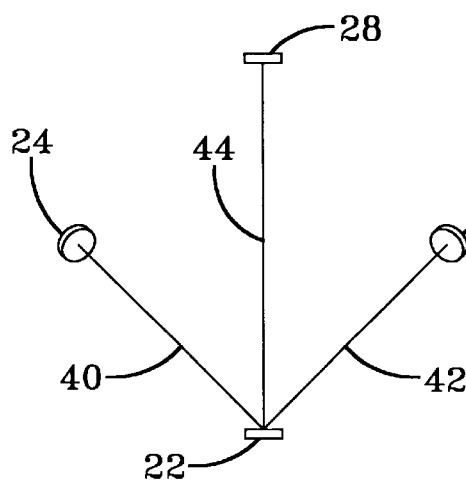
Figure 4C:
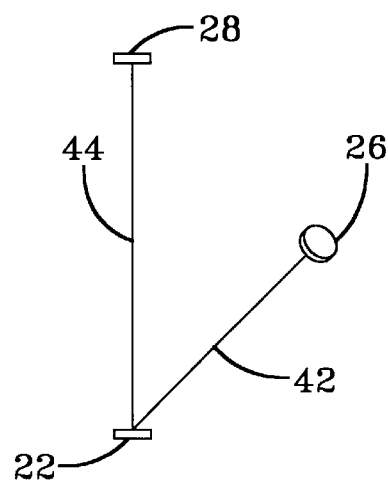

A disadvantage of the prior art is that sensor arrays tend to pair transmitters and receivers. This requires additional calibrations as separate transmitters perform differently. In the present invention, a single transmitter is used with several receivers. FIGS. 4A, 4B and 4C schematically show three views of an exemplary spatial configuration of a transmitter 22 and three receivers 24, 26, 28 in accordance with the present invention.

FIG. 4A is a top view showing the three receivers 24, 26, 28 with the transmitter 22 being hidden directly below the receiver 28. The direct acoustic paths from transmitter 22 to receivers 24, 26 are 40 and 42, respectively. FIG. 4B is a front view showing the transmitter 22, the right receiver 26 and the associated direct acoustic path 42, the central receiver 28 and its direct path 44 and the left receiver 24 and the direct path 40. FIG. 4C is a side view showing the transmitter 22, the right receiver 26 and direct path 42, and the central receiver 28 and direct path 44. The three-dimensionality of the configuration lends itself to being able to measure all wind velocity wind components with high angles of attack with very little sensor shadowing. With the use of a high frequency acoustic signal and a high data sampling rate as described above, the distance of the direct acoustic path from the transmitter to each receiver can be on the order of a centimeter.

Figure 5:
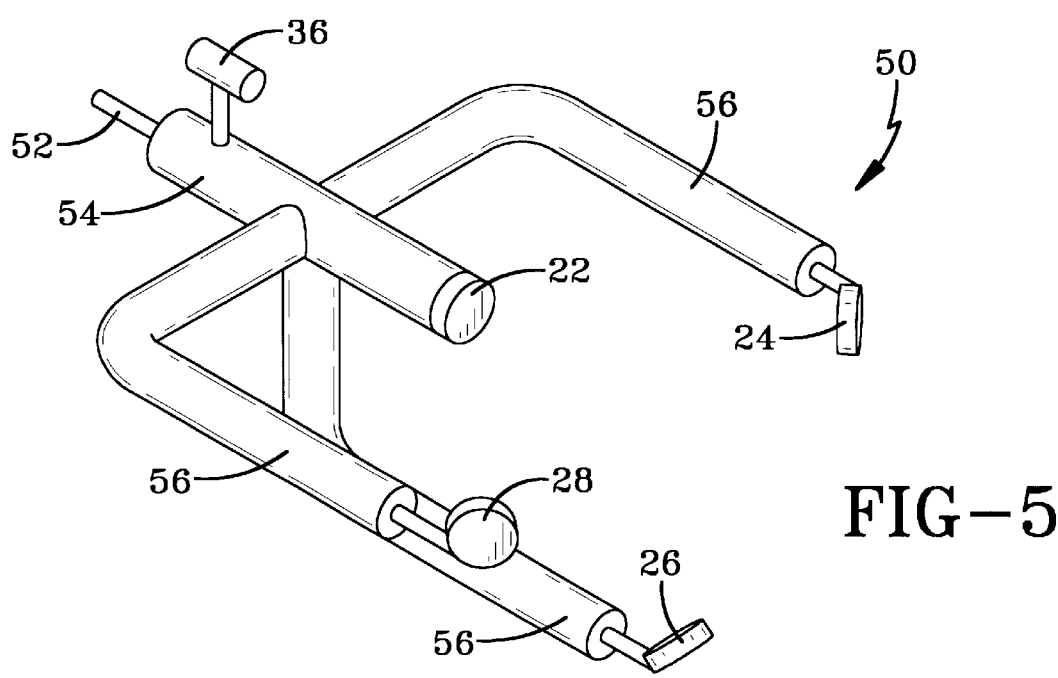
FIG. 5 shows a support structure for the acoustic sensors.

FIG. 5 shows a support structure 50 for the acoustic sensors. Support structure 50 includes a base portion 54 with a transmitter 22 mounted on an end thereof. Three receiver support legs 56 are attached to the base portion 54 and function to hold receivers 24, 26, 28. More receiver support legs 56 may be used in embodiments that use more than three receivers. A temperature sensor 36 may be attached to base portion 54 when the temperature is not determined acoustically. Preferably, support structure 50 is hollow so that wiring to the transmitter, receivers and temperature sensor (when used) may be placed inside the hollow support legs 56 and base 54. A wire harness 52 leads to the signal generator 32 and signal processor 34. Support structure 50 may be made of, for example, wood, plastic or metal. The support structure 50 may be mounted, by way of example, on the outside of an aircraft or on a stationary structure such as a tower or tripod.

While the invention has been described with reference to certain preferred embodiments, numerous changes, alterations and modifications to the described embodiments are possible without departing from the spirit and scope of the invention, as defined in the appended claims and equivalents thereof.

What is claimed is:

1. An apparatus for measuring a velocity vector of a fluid flow comprising:

a signal generator for generating an oscillating electrical signal;

an acoustic transmitter for receiving the oscillating electrical signal and generating an acoustic signal proportional to said oscillating electrical signal;

at least three acoustic receivers for receiving the acoustic signal and generating electrical signals in response thereto which are phase shifted by the influence from the fluid flow;

a support structure for supporting the acoustic transmitter and the at least three acoustic receivers in a noncoplanar array;

a signal processor for receiving and processing the oscillating electrical signal generated by the signal generator and the electrical signals generated by the at least three acoustic receivers to determine a time delay for each acoustic receiver caused by the influence of the fluid flow; and wherein the signal processor determines fluid flow velocity vector components u, v, w, in accordance with the formula $$u^2+v^2+w^2-A_i(C_iu+D_iv+E_iw)-B_i=0$$

where $A_i$ and $B_i$ are coefficients dependent on the time delays and $C_i$, $D_i$, and $E_i$ are coefficients dependent on the relative positions of the acoustic receivers to the acoustic transmitter.

2. The apparatus of claim 1 wherein distances from the acoustic transmitter to each of the acoustic receivers are the same.

3. The apparatus of claim 1 further comprising a temperature sensor connected to the signal processor.

4. The apparatus of claim 3 wherein temperature is determined acoustically as a ratio of specific heats for air times the gas constant for air divided by the square of the speed of sound in air.

5. The apparatus of claim 1 wherein the acoustic transmitter generates a high frequency acoustic signal.

6. The apparatus of claim 5 wherein the signal processor repetitively receives and processes the oscillating electrical signal generated by the signal generator and the electrical signals generated by the at least three acoustic receivers at a high sampling rate.

7. The apparatus of claim 6 wherein a frequency of the high frequency acoustic signal is about 350 kHz and the high sampling rate of the signal processor is about 10 kHz.

8. The apparatus of claim 1 wherein the support structure includes a base portion for holding the acoustic transmitter and at least three receiver support legs for holding the at least three acoustic receivers.

9. The apparatus of claim 1 wherein the fluid flow is wind and the signal processor determines the wind velocity vector using an iterative solution.

10. The apparatus of claim 6 wherein a distance from the acoustic transmitter to each of the at least three acoustic receivers is about a centimeter.

* * * * *